US006625379B1

United States Patent
Azuma (10) Patent No.: US 6,625,379 B1
(45) Date of Patent: Sep. 23, 2003

(54) LIGHT-CONDUCTING PLATE AND METHOD OF PRODUCING THE SAME

(75) Inventor: Naoki Azuma, Kanagawa (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 199 days.

(21) Appl. No.: 09/689,606

(22) Filed: Oct. 13, 2000

(30) Foreign Application Priority Data

Oct. 14, 1999 (JP) .......................................... 11-291834

(51) Int. Cl.$^7$ ................................................. G02B 6/10
(52) U.S. Cl. ...................................................... 385/146
(58) Field of Search ............................. 349/62, 63, 65; 385/146

(56) References Cited

U.S. PATENT DOCUMENTS

| | | | | |
|---|---|---|---|---|
| 4,180,529 A | * | 12/1979 | Hofmann | ..................... 525/85 |
| 5,061,771 A | * | 10/1991 | Oshima et al. | ............. 526/282 |
| 5,179,171 A | * | 1/1993 | Minami et al. | ............. 525/288 |
| 5,269,977 A | * | 12/1993 | Nakahashi et al. | .......... 264/1.9 |
| 5,599,882 A | * | 2/1997 | Nishi et al. | ............... 525/332.1 |

FOREIGN PATENT DOCUMENTS

| | | | |
|---|---|---|---|
| JP | 53-58554 | * | 5/1978 |
| JP | 55-94917 | * | 7/1980 |
| JP | 57-8815 | * | 2/1982 |
| JP | 58-46447 | * | 3/1983 |
| JP | 60-168708 | * | 9/1985 |
| JP | 61-32346 | * | 2/1986 |
| JP | 62-252406 | * | 11/1987 |
| JP | 63-145324 | * | 6/1988 |
| JP | 63-264626 | * | 11/1988 |
| JP | 1-240517 | * | 9/1989 |
| JP | 2-133413 | * | 5/1990 |
| JP | 3-209293 | * | 9/1991 |
| JP | 10-138275 | * | 5/1998 |
| JP | 10-138331 | * | 5/1998 |

* cited by examiner

*Primary Examiner*—Javaid H. Nasri
(74) *Attorney, Agent, or Firm*—Birch, Stewart, Kolasch & Birch, LLP

(57) ABSTRACT

Disclosed is a light-conducting plate which comprises a transparent resin containing a carbonic acid gas and which has a carbonic acid gas content of from 0.01 to 2% by weight based on the weight of the light-conducting plate. The plate used in a planar light emitting device exhibits increased luminance, improved luminance uniformity, and reduced color unevenness. Also disclosed is a method of producing the light-conducting plate.

9 Claims, 6 Drawing Sheets

FIG.6

LIGHT-CONDUCTING PLATE AND METHOD OF PRODUCING THE SAME

FIELD OF THE INVENTION

This invention relates to a light-conducting plate for a planar light emitting device which can be used in displays, especially those of the types which do not emit light by themselves but utilize light from an external unit, and a method of producing the light-conducting plate. The light-conducting plate of the invention is useful for planar light emitting devices, such as a display panel of meters, etc. on the dashboard and a back light or a front light of liquid crystal displays (LCDs).

BACKGROUND OF THE INVENTION

Brightness and color of a display of LCDs, etc. are governed by a planar light emitting device used. The planar light emitting device is therefore required to emit bright and uniform light.

Figure 1:
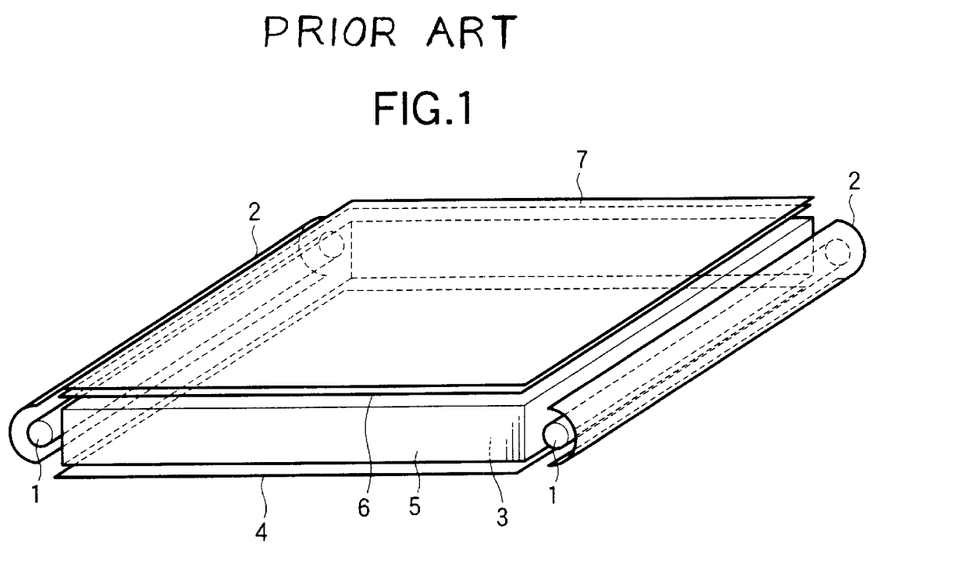
FIG. 1 is a schematic view illustrating an example of a planar light emitting device.

Conventional planar light emitting devices are assembled from various constituting members including, as shown in FIG. 1, a light source comprising a lamp 1 and a reflector 2 and a light-conducting plate 5 having a reflecting layer 3 and a reflecting sheet 4. The light-conducting plate 5 propagates the light from the light source incident on its side surface and emits the propagated light from its light-emitting surface. If necessary, the device is provided with a light-scattering member 6 for non-directionally scattering the light from the light-conducting plate 5 and the device generally also includes one or two output light controlling member(s) 7 having a prism lens shape.

Conventional studies for obtaining bright and uniform light from the planar light emitting device had been focused, for the part, on the light source (the lamp 1 and the reflector 2), the material or the pattern of the reflecting layer 3, the material and configuration of the light-scattering member 6 or the output light controlling member 7, or the number of the constituent members to be stacked. Notwithstanding the fact that the brightness (luminance) or uniformity of the brightness largely depends on the light-conducting plate 5, little study has been given to the light-conducting plate itself. JP-U-B-58-46447 (The term "JP-U-B" used herein means a "published Japanese Utility Model") proposes dispersing light-scattering particles in a light-conducting plate, aiming to efficiently scatter the incident light by the particles to improve the brightness (luminance) of the emitted light. According to the disclosure, however, the concentration of the particles is so complicatedly related to the size of a light-conducting plate such that one concentration is set for one size of a light-conducting plate, and not generally used for every size of the light-conducting plate. JP-A-3-209293 (The term "JP-A" used herein means an "unexamined published Japanese patent application") discloses incorporation into a light-conducting plate air bubbles which are expected to produce the same effect as by the light-scattering particles. However, because the air bubbles are as large as 10 to 2000 μm and meet difficulty in controlling the disperse state, making it hard to prepare a trial product in a laboratory, still more to manufacture on an large scale. JP-A-10-138275 proposes a method of producing a light-conducting plate by injection molding in which a mold cavity is previously filled with carbon dioxide to a pressure of 10 Mpa or less. This method aims at elimination of product defects through improvement in precision of transferring fine unevenness of the cavity wall onto the light-conducting plate thereby to improve the performance of the light-conducting plate. WO98/52734 discloses a method of producing a light-conducting plate, in which a molten resin having dissolved therein 0.2% by weight or more of gas so as to have a reduced melt viscosity is injection molded in a cavity having previously been pressurized with gas at or above a certain pressure at which no foaming is induced at the flow front. The method also aims at improvement of performance by eliminating product defects such that the such that the reproducibility of the cavity configuration, such as sharp edges and fine unevenness, may be improved, weld lines may be less noticeable, and the flowability of the resin may be improved to reduce the resin orientation or the birefringence. Neither JP-A-10-138275 nor WO98/52734 clarifies the relationship between the gas content in the molded product and the performance as a light-conducting plate.

SUMMARY OF THE INVENTION

An object of the present invention is to provide a light-conducting plate which emits light with improved brightness (luminance), improved uniformity of the luminance, and reduced unevenness of color, irrespective of its size and shape.

Another object of the present invention is to provide a method of manufacturing the light-conducting plate.

Other objects and effects of the present invention will become apparent from the following description.

As a result of extensive studies, the present inventors have found that the above objects of the present invention are accomplished by the presence of carbonic acid gas in the light-conducting plate in a concentration of 0.01 to 2% by weight.

That is, the above objects of the present invention have been achieved by providing the following light-conducting plates and method of producing the same.

(1) A light-conducting plate which comprises a transparent resin containing a carbonic acid gas and which has a carbonic acid gas content of from 0.01 to 2% by weight based on the weight of the light-conducting plate.

(2) The light-conducting plate according to the above item (1), wherein said transparent resin is selected from methacrylic resins, polycarbonate resins and cyclic olefin resins.

(3) The light-conducting plate according to the above item (1) or (2), wherein said transparent resin is a polycarbonate resin having a terminal hydroxyl group in a proportion of from 1 to 30 mol % based on the whole terminal groups.

(4) The light-conducting plate according to the above item (1) or (2), wherein said transparent resin contains at least one of a saturated aliphatic higher alcohol, a glycerol higher fatty acid ester, and an ultraviolet absorber.

(5) The light-conducting-plate according to any one of the above items (1), (2) and (4), wherein said transparent resin is a methacrylic resin.

(6) The light-conducting plate according to any one of the above items (1) to (5), wherein said transparent resin further contains fine particles.

(7) The light-conducting plate according to any one of the above items (1) to (6), which has a light-emitting surface and an opposite surface and has fine unevenness on at least one of these surfaces.

(8) The light-conducting plate according to any one of the above items (1) to (7), which has a light-emitting surface having a lens shape.

(9) The light-conducting plate according to any one of the above items (1) to (8), which has a wedge shape having an inclined reflecting plane.

(10) A method of producing a light-conducting plate, which comprises:

melt-kneading a transparent resin in a cylinder while pressurizing the cylinder by feeding a carbonic acid gas thereinto under a pressure of from 1 to 15 MPa;

injecting the molten resin into a mold cavity pressurized with a carbonic acid gas beforehand to a pressure which is from 1 to 15 MPa and which is at least a pressure where foaming does not occur at a flow front of the molten resin to be injected;

releasing part of the carbonic acid gas by partially reducing the pressure in the cavity while conducting dwelling; and     cooling the molded resin to obtain a molded article,     wherein said molded article contains a carbonic acid gas and having a carbonic acid gas content of from 0.01 to 2% by weight based on the weight of the molded article.

DETAILED DESCRIPTION OF THE INVENTION

The material for the light-conducting plate of the invention is not particularly limited as long as it is transparent. Taking light-scattering properties into consideration, materials mainly comprising a transparent resin are preferred. Transparent resins having a total light transmittance of 30% or more at a thickness of 3 mm as measured according to ASTM D-1003 are usually used. Such transparent resins preferably include methacrylic resins, polycarbonate resins, cyclic olefin resins, styrene resins, blends comprising at least one of these resins, and compositions comprising at least one of these resins.

The methacrylic resins which can be used in the invention include polymers mainly comprising methyl methacrylate, such as methyl methacrylate homopolymers and copolymers with at least one copolymerizable monomer selected from methyl acrylate, ethyl acrylate, n-propyl acrylate, isopropyl acrylate, butyl acrylate, acrylonitrile, acrylic acid, methacrylic acid, vinylpyridine, vinylmorpholine, vinylpyridone, tetrahydrofurfuryl acrylate, N,N-dimethylaminoethyl acrylate, N,N-dimethylacrylamide, 2-hydroxyacrylate, ethylene glycol monoacrylate, glycerol monoacrylate, maleic anhydride, styrene, α-methylstyrene, etc.; heat-resistant methacrylic resins, low-hygroscopic methacrylic resins, and impact-resistant methacrylic resins. The impact-resistant methacrylic resins are methacrylic resins endowed with impact resistance by blending rubber elastics. The rubber elastics to be blended are described in JP-A-53-58554, JP-A-55-94917 and JP-A-61-32346. To be brief, the rubber elastics are multi-stage polymers produced by a multi-stage successive polymerization process in which an elastic layer and a non-elastic layer are alternately formed on a methacrylic polymer core. These methacrylic resins can be used either individually or as a mixture (polmer blend) of two or more thereof. The polymerization methods are not particularly restricted.

The polycarbonate resins which can be used in the invention include polymers derived from dihydric phenol compounds represented by bisphenol A. The process for producing the polycarbonate resins is not restricted and includes a phosgene process, ester interchange, and solid phase polymerization. Polycarbonate resins having a terminal hydroxyl group in a proportion of 1 to 30 mol % based on the whole terminal groups are particularly preferred. Such polycarbonate resins produce a hydrogen bond between the terminal OH group and a carbonic acid gas so that the carbonic acid gas may exist in the resin stably for an extended period of time without dissipation. Since large proportions of the terminal hydroxyl group tend to deteriorate thermal stability of the polycarbonate resins, a more preferred proportion of the terminal hydroxyl group is 1 to 15 mol %, particularly preferably from 3 to 13 mol %, most preferably from 5 to 11 mol %. The proportion of the terminal hydroxyl group can be measured by NMR.

The cyclic olefin resins which can be used in the invention are homo- or copolymers having a cyclic olefin skeleton, such as norbornene and cyclohexadiene, in the polymer chain, which belong to amorphous thermoplastic resins. Production of the cyclic olefin resins is not particularly restricted. Useful cyclic olefin resins mainly comprising norbornene, for example, are described in JP-A-60-168708, JP-A-62-252406, JP-A-2-133413, JP-A-63-145324, JP-A-63-264626, JP-A-1-240517, and JP-B-57-8815. If desired, a soft polymer may be added to the cyclic olefin resins. Useful soft polymers include olefin soft polymers comprising an α-olefin, isobutylene soft polymers comprising isobutylene, diene soft polymers comprising butadiene, isoprene, etc., cyclic olefin soft polymers comprising a cyclic olefin such as norbornene or cyclopentene, organopolysiloxane soft polymers, soft polymers comprising an α,β-unsaturated acid or a derivative thereof, soft polymers comprising an unsaturated alcohol and an amine or an acyl derivative or acetal thereof, polymers of epoxy compounds, and fluororubbers.

The styrene resins which can be used in the invention include styrene homopolymers, copolymers mainly comprising styrene, and polymer blends of such a homo- or copolymer and other resins. Polystyrene, a styrene-acrylate copolymer or a styrene-methacrylate copolymer are preferred. Transparent rubber-reinforced polystyrene, which is a styrene resin having rubber dispersed therein, is also preferred.

Of the materials described above, particularly preferred are compositions comprising a transparent methacrylic, polycarbonate or cyclic olefin resin.

According to the purpose and necessity, the transparent resin composition can contain desired additives, such as heat stabilizers, antioxidants, ultraviolet absorbers, surface active agents, lubricants, fillers, flame retardants, parting agents, pigments, dyes, fluorescent whitening agents, impact modifiers, and polymer additives.

It is particularly preferred to add at least one of saturated aliphatic higher alcohols, glycerol higher fatty acid esters, and ultraviolet absorbers. The saturated aliphatic higher alcohols and glycerol higher fatty acid esters are known as parting agents for improving readability from a mold. The ultraviolet absorbers prevent yellowing of the light-conducting plate by ultraviolet light emitted from a cathode ray tube that is used as a lamp, disposed close to the light-conducting plate. However, the saturated aliphatic higher alcohols, glycerol higher fatty acid esters and ultraviolet absorbers are generally difficult to use because they have a slight color of themselves and, if added in effective amounts, cause coloration of the light-conducting plate, resulting in reductions of luminance and uniformity. Since the resin composition containing a carbonic acid gas according to the invention is equal or superior to a transparent resin containing no such additives in luminance and uniformity, the light-conducting plate can enjoy further improved performance with these additives added in amounts just enough to eliminate stick in a mold or deterioration by ultraviolet light which may occur with a transparent resin having no additives.

The saturated aliphatic higher alcohols which can be used in the invention preferably include saturated alkyl alcohols having 10 to 30 carbon atoms, with stearyl alcohol being particularly preferred.

The glycerol higher fatty acid esters which can be used in the invention are represented by the following formula (Y):

wherein R represents an alkyl or hydroxyalkyl group containing an odd number of carbon atoms of from 11 to 25; and $X_1$ and $X_2$ each represents a hydrogen atom or —C(=O)R. Examples thereof preferably include mono- and/or diglycerides of saturated fatty acids, such as palmitic acid, stearic acid, hydroxystearic acid, and behenic acid, and of unsaturated fatty acids, such as oleic acid and linolenic acid. A mono- and/or diglyceride of palmitic acid or stearic acid is still preferred.

The ultraviolet absorbers which can be used in the invention include benzotriazole compounds, 2-hydroxybenzophenone compounds, hydroxyphenyltriazine compounds, and phenyl salicylate compounds. The benzotriazole compounds include 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-t-butylphenol, 2-[5-chloro(2H)-benzotriazol-2-yl]-4-methyl-6-(t-butyl)phenol, 2,4-di-t-butyl-6-(5-chlorobenzotriazol-2-yl)phenol, 2-(2H-benzotriazol-2-yl)-4,6-di-t-pentylphenol, and 2-(2H-benzotriazol-2-yl)-4-(1,1,3,3-tetramethylbutyl) phenol. The 2-hydroxybenzophenone compounds include 2-hydroxy-4-methoxybenzophenone, 2-hydroxy-4-octoxybenzophenone, 2,4-dihydroxybenzophenone, 2-hydroxy-4-methoxy-4'-chlorobenzophenone, 2,2-dihydroxy-4-methoxybenzophenone, and 2,2-dihydroxy-4, 4'-dimethoxybenzophenone. The hydroxyphenyltriazine compounds include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3 ,5-triazine, 2,4-diphenyl-6-(2-hydroxy-4-(2-butoxyethoxy)phenyl)-1,3, 5-triazine, 2,4-di-p-toluyl-6-(2-hydroxy-4-methoxyphenyl)-1,3,5-triazine, 2,4-di-p-toluyl-6-(2-hydroxy-4-ethoxyphenyl)-1,3,5-triazine, 2,4-di-p-toluyl-6-(2-hydroxy-4-propoxyphenyl)-1,3,5-triazine, 2,4-di-p-toluyl-6-(2-hydroxy-4-butoxyphenyl)-1,3,5-triazine, 2,4-di-p-toluyl -6-(2-hydroxy-4-hexyloxyphenyl)-1,3,5-triazine, 2,4-di-p-toluyl-6-(2-hydroxy-4-octyloxyphenyl)-1,3,5-triazine, 2,4-di-p-toluyl-6-(2-hydroxy-4-dodecyloxyphenyl)-1,3,5-triazine, 2,4-di-p-toluyl-6-(2-hydroxy-4-benzyloxyphenyl)-1,3,5-triazine, and 2,4-diphenyl-6-(2-hydroxy-4-(2-hexyloxyethoxy)phenyl)-1,3,5-triazine. The phenyl salicylate compounds include p-t-butylphenyl salicylate and p-octylphenyl salicylate.

Preferred of the above-enumerated saturated aliphatic higher alcohols, glycerol higher fatty acid esters and ultraviolet absorbers are those having a hydroxyl group in their molecule for the same reason stated above. That is, the hydroxyl group of the compound forms a hydrogen bond with a carbonic acid gas, allowing more carbonic acid gas to exist in the transparent resin stably for an extended period of time without dissipation.

The saturated aliphatic higher alcohol is preferably added in a concentration of 300 to 3000 ppm, particularly 500 to 2000 ppm. The glycerol higher fatty acid ester is preferably added in a concentration of 300 to 5000 ppm, particularly 500 to 4500 ppm. Where the saturated aliphatic higher alcohol and the glycerol higher fatty acid ester are used in combination, they are preferably used in a total concentration of 500 to 5000 ppm, particularly 700 to 4000 ppm. The ultraviolet absorber is preferably added in a concentration of 30 to 500 ppm, particularly 50 to 300 ppm.

The light-conducting plate may contain particles. The particles which can be added include particles causing light-scattering by making use of a refractive index difference (hereinafter referred to as fine particles (I)) and particles causing light-scattering by making use of irregular reflection (hereinafter referred to as fine particles (II)). The fine particles (I) include crosslinked organic polymer beads, such as those of acrylic polymers, styrene-acrylic polymers or polyethylene, and crosslinked silicone polymer beads, such as those of polysiloxane. The particles (II) include inorganic particles, such as glass, silicone, titanium oxide or calcium carbonate particles. The fine particles (I) and (II) can have a spherical shape, an acicular shape, a flaky shape or a nearly spherical shape. The fine particles (I) preferably have an average particle size of 0.1 to 100 μm, particularly 1 to 50 μm, especially 1 to 20 μm. The fine particles (II) preferably have an average particle size of 0.1 to 30 μm, particularly 1 to 10 μm. The difference in refractive index of the fine particles (I) from the base material (matrix) of the light-conducting plate, which governs their performance, is preferably within ±0.1. It is particularly preferred that the refractive index of the fine particles (I) be lower than that of the matrix by 0.003 to 0.1. Organic silicone-based crosslinked beads, which are polysiloxane-series, are especially preferred; for they are spherical, which is advantageous for uniform light scattering, and have a smaller refractive index than the matrix, which is advantageous for front scattering. The fine particles (I) and (II) are preferably used in a concentration of 1 to 10,000 ppm, particularly 1 to 5,000 ppm. These fine particles may be used alone or as a mixture of two or more kinds thereof.

The term "carbonic acid gas" in the present invention is intended to mean a gas having a carbon dioxide content of at least 50% by weight. Seeing that carbonic acid gas is cheap and easily available, the present invention is practical.

The carbonic acid gas present in the light-conducting plate of the invention does not exist in the form of "bubbles" perceptible with the naked eye as has been known conventionally. There is no visually perceptible difference between the external appearance of the light-conducting plate of the invention and one containing no gas, but these light-conducting plates show a difference from each other in volume expansion upon being heated.

The light-conducting plate of the invention exhibits improved luminance and improved luminance uniformity owing to a carbonic acid gas present therein through the following mechanism of action. The carbonic acid gas present near the surface of the light-conducting plate is dissipated in the air immediately after the production, while the carbonic acid gas in the inside of the plate remains so that the carbonic acid gas is unevenly distributed in the plate, having its concentration increased from the surface toward the center. Where the plate is made of a methacrylic resin, for example, since the methacrylic resin and carbonic acid gas have a refractive index of 1.49 and about 1.00, respectively, the light-conducting plate has its refractive index decreased from its surface having a lower carbonic acid gas concentration towards the center having a higher carbonic acid gas concentration. When light is incident upon the side surface of the light-conducting plate having such a refractive index distribution, the light proceeds in the directions from the center toward the peripheries. The light in a direction to the reflecting plane is reflected and joins the light proceeding in the direction to the light-emitting surface side and is emitted together from the light-emitting surface. As a result, more light is emitted from the light-emitting surface more efficiently to bring about improvement in luminance and luminance uniformity of the light-emitting surface of the planar light emitting device.

The amount of the carbonic acid gas present in the light-conducting plate of the invention is 0.01 to 2% by weight. JP-A-10-138275 and WO98/52734 supra teach that a molded article containing a carbonic acid gas gradually dissipates the carbonic acid gas when left to stand in the air and comes to be equal in performance to one containing no carbonic acid gas. Actually, however, the amount of carbonic acid gas dissipated from a molded light-conducting plate is very small, and carbonic acid gas is capable of remaining in the plate for a long period of time under ordinary conditions of use. Further, improvement in luminance and luminance uniformity can be obtained at a carbonic acid gas content of 0.01% by weight or more.

If more than 2% by weight of carbonic acid gas is present, the luminance and the luminance uniformity of the light-conducting plate would be so increased, but the mechanical strength and heat resistance of the plate itself are largely reduced, and cracks tend to develop with environmental changes. A preferred carbonic acid gas content is 0.03 to 1.8% by weight, particularly 0.05 to 1.5% by weight, especially 0.1 to 1.5% by weight. In case the carbonic acid gas content in a molded light-conducting plate decreases below 0.01% by weight after long-term use, the plate can easily be supplemented with a carbonic acid gas to a concentration of 0.01 to 2% by weight by pressurizing with a carbonic acid gas in a pressure vessel, etc. thereby to restore its performance.

The carbonic acid gas content in a light-conducting plate can be measured from the difference between the weight of a plate immediately after molding (where the molded plate is of a large size, it could be cut to at least three portions having substantially the same size) and the weight of the plate (or the cut piece of the plate) having been allowed to stand in a hot air drier at a temperature higher than the glass transition point of the resin constituting the plate by at least 30° C. for 3 hours or longer to let the carbonic acid gas in the plate dissipate until the weight becomes constant.

It is known in the art that a fine pattern can be printed on the light reflecting plane to form a reflecting layer for making incident light be emitted as bright and uniform planar light and that a fine pattern may also be printed on the light-emitting surface to output uniform light. These techniques can be applied to the light-conducting plate of the invention without particular restrictions.

It is preferred for the light-emitting surface and/or the opposite surface of the light-conducting plate of the invention to have fine unevenness, which eliminates the necessity of forming a reflecting layer by printing. The fine unevenness includes, but it not limited to, an uneven pattern made up of distinctly shaped units having spherical or non-spherical surfaces, such as rectangular parallelopipeds, circular or elliptic cylinders, and triangular prisms, and an uneven pattern made up of indistinctly shaped units, such as a satin texture and hairlines; a combined uneven pattern made up of distinctly shaped units and indistinctly shaped units; and an uneven pattern made up of distinctly shaped units of various shapes, particularly of varying sizes.

Figure 2:
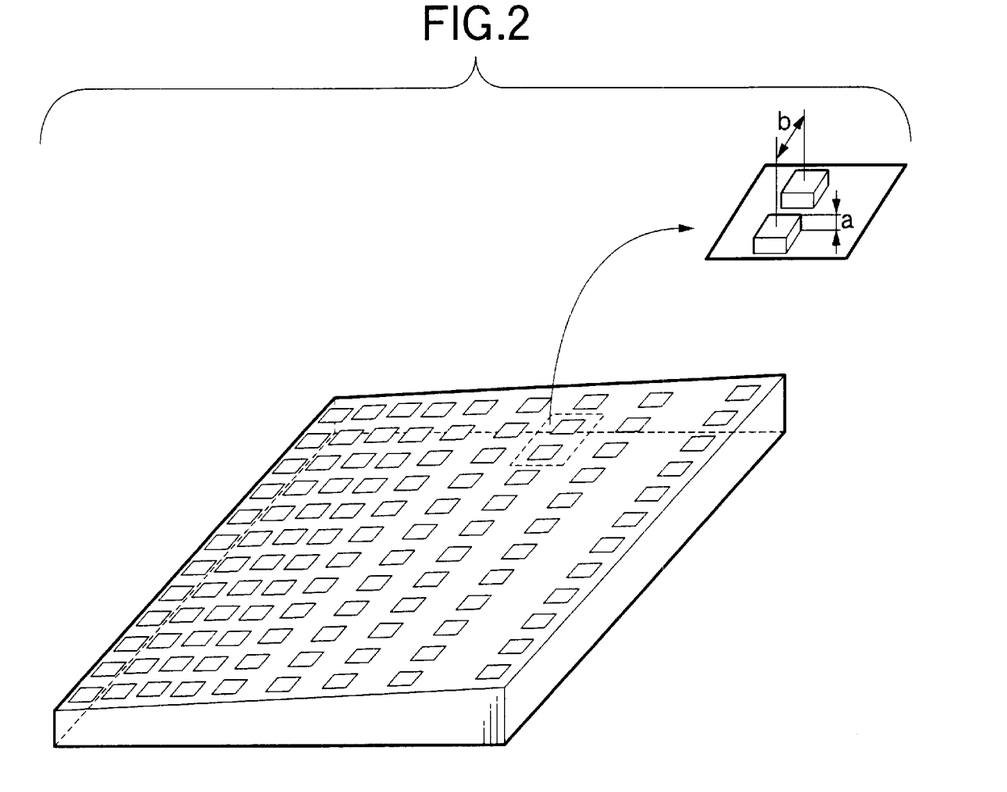
FIG. 2 is a schematic view illustrating a light-conducting plate having fine unevenness.

The profile of the unevenness made up of distinctly shaped units, which is observable through an optical microscope or an electron microscope, is preferably such that the ratio (b/a) of the pitch (b) of the units to the height or depth (a) of the units is from 0.2 to 500, particularly from 1 to 50. The terms "height or depth (a)" and "pitch (b)" of units are defined as depicted in FIG. 2. That is, the "height or depth (a)" of units is the maximum height or depth of the units, and the "pitch (b)" of units is the center-to-center distance of adjacent units. As far as the b/a ratio falls within the range of from 0.2 to 500, the height or depth (a) and/or the pitch (b) may vary arbitrarily in the width direction or the lengthwise direction. The height or depth (a) is preferably 0.1 to 500 μm, still preferably 1 to 50 μm. The pitch (b) is preferably 10 to 10,000 μm, still preferably 100 to 5000 μm.

In the case of unevenness made up of indistinctly shaped units such as a satin texture and hairlines, the profile of the unevenness is preferably such that $R_y$ (the maximum height of surface roughness, as measured in accordance with JIS B 0601) is in the range of from 1 to 100 μm, particularly 1 to 50 μm. The profile measurement can be made with a commercially available surface roughness meter.

The light-emitting surface of the light-conducting plate of the invention preferably has a lens shape. The lens shape is not particularly limited and examples thereof include prisms, fly eye lenses, microlenses, cylindrical lenses, Fresnel lenses, linear Fresnel lenses, and lenticular lenses, and mixtures thereof.

The light-conducting plate according to the invention is used as a side-lighted type light-conducting plate which receives light from its side surface and causes planar emission of light. The planar light emitting device shown in FIG. 1 is an illustrative example of the application.

The shape of the light-conducting plate of the invention is not particularly limited and includes a flat plate, a wedge, and a circular or elliptical cylinder. The plate can have cutouts or holes for assembly. It can have ribs or non-uniformity in thickness. Light can enter the light-conducting plate from one or more side surfaces of the plate. In a preferred embodiment, the light-conducting plate has a wedge shape having an inclined reflecting plane. A light-conducting plate of this type is to guide light therethrough by taking advantage of the total reflection on the reflecting plane where a reflecting layer is provided. In this case, a light source is set facing the larger thickness side. Usually, no light source is put by the opposite smaller thickness side, or the light source by the smaller thickness side, if any, is weaker in quantity of light than the light source on the larger thickness side. Such a wedge-shaped light-conducting plate has had problems because the quantity of light from the light source differs between the thicker side and the thinner side, tending to have reduced luminance uniformity, and also the light quantity is not sufficient for satisfactory luminance. Since the existence of carbonic acid gas not only improves the luminance uniformity but increases the luminance per se, the present invention is especially effective when applied to this type.

It is essential in the present invention that carbonic acid gas be present in the light-conducting plate. Carbonic acid gas can be incorporated into the plate by various methods. For example, a molded light-conducting plate is put in a pressure vessel, which is pressurized with carbonic acid gas to have the plate absorb the gas, or carbonic acid gas can be incorporated into a molten resin to be molded. A particularly preferred method comprises melt-kneading a transparent resin in the cylinder of an injection molding machine while pressurizing the cylinder by feeding carbonic acid gas thereto and injecting the molten resin into the cavity pressurized with carbonic acid gas beforehand, releasing part of the carbonic acid gas from the cavity while conducting dwelling, followed by cooling and opening the mold to take out the molded article. The carbonic acid gas pressure fed to the cylinder is preferably 1 to 15 MPa, still preferably 2 to 12 MPa. Under a lower pressure than 1 MPa, the resultant carbonic acid gas content in the molded plate tends to be less than 0.01% by weight. If the pressure is 15 MPa or higher, the resultant carbonic acid gas content in the molded plate tends to exceed 2% by weight, which results in considerable reductions in mechanical strength and heat resistance of the molded plate. Moreover, cracks tend to develop during post-molding printing or during use in high humidity.

The zone of the cylinder where carbonic acid gas is to be fed may be any of the zone right under the hopper, the middle of the cylinder, and the cylinder head, with the middle of the cylinder being preferred. An opening for feeding carbonic acid gas can be made in the middle of the cylinder, or a vented cylinder can be used to utilize its vent hole as a feed opening. It is desirable to use a screw having deep channels so that the fed carbonic acid gas may be effectively mixed into the resin, and is also desirable to reduce the screw clearance in the immediate rear of the carbonic acid gas feed opening so as to prevent fed carbonic acid gas from leaking toward the resin feed opening. It is preferred to close the system from the resin feed opening (inclusive of the hopper) to the screw head.

In order to prevent the molten resin from ejecting from the nozzle of the screw head while kneaded with carbonic acid gas fed under high pressure, it is necessary to close the nozzle with a shut-off nozzle during the melt kneading step and the cooling step until the start of the next shot. Commercially available shut-off nozzles of needle type or valve type, etc. can be used, which can be controlled electrically, hydraulically or by any commercially available mechanism. The injection molding machine may be either of in-line screw type or of screw-plunger type. The screw may be provided with a mixing mechanism, such as a Dulmage mixing section or a pin mixing section, to achieve efficient melt kneading while feeding carbonic acid gas.

The pressure of carbonic acid gas, with which the mold cavity is pressurized beforehand, is preferably between 1 MPa and 15 MPa and is preferably at least a pressure where foaming does not take place at the flow front of the injected molten resin. If the pressure in the cavity is lower than 1 MPa, foaming always occurs at the flow front however low the pressure applied in the cylinder may be or however the injection conditions may be altered. A pressure exceeding 15 MPa is not favorable, only to increase the load of the mold sealing structure and to decrease the clamping force which is virtually applied to the resin. Considering that the cavity space decreases to increase the inner pressure according as the cavity is filled with the resin, a particularly preferred pressure of carbonic acid gas fed beforehand into the cavity is 2 to 10 MPa. While foaming does not take place at the flow front when the carbonic acid gas pressure of the cavity is equal to that fed to the cylinder, a lower pressure of the cavity than the pressure of carbonic acid gas fed into the cylinder is practically enough to sufficiently suppress the foaming because of addition of an injection pressure and due to solidification of the molten resin during cavity filling with the resin.

The stage of releasing the carbonic acid gas from the cavity is preferably in the pressure dwelling step. If the gas is released in the course of injection, the resin tends to foam. Where the gas is released at the stage of switching from injection to pressure dwelling, the gas release will create a turbulent flow in the cavity, which easily causes molding defects on the surface of the molded article where solidification has not proceeded sufficiently. Continuing pressurizing with carbonic acid gas even after the end of pressure dwelling, i.e., in the step of cooling produces no further effects, rather resulting in defects such as sink marks due to reduction in mold clamping force by the carbonic acid gas pressure. A preferred stage of the gas release is from 0.1 second after the start of the pressure dwelling until 1 second before the end of the pressure dwelling, particularly from 0.2 second after the start of the pressure dwelling until 2 seconds before the end of the pressure dwelling. The terminology "pressure dwelling" denotes a step in injection molding which follows the step of filling the cavity with a molten resin and in which resin injection is further continued to apply a resin pressure, or denotes a step in injection compression molding in which the molten resin in the cavity is pressurized by mold clamping. Both the above-described steps may be performed in combination. The terminology "cooling" means the step of cooling a molded article in the mold for a sufficient time for the molded article to become no more deformable even when taken out from the mold. The cooling step can be designed in relation to the mold temperature and the molding temperature in accordance with conventional analysis.

The mold clamping mechanism for use in the invention is conventional. A mold clamping mechanism having an injection compression mechanism may be used. The clamping force may be changed during the steps of pressure dwelling and cooling.

The light-conducting plate for a planar light emitting device according to the invention is useful in various planar display equipment for LCDs, sign-boards or for film observation. It is particularly fit for use in LCDs; for planar light emission in LCDs should be uniform, bright (high luminance) and free from color unevenness. It is especially suitable for planar light emitting devices of large-sized LCDs, such as 10-inch or larger notebook computer monitors or other displays, LCDs of mobile phones which have recently been increasing the display size, 4-inch or larger LCDs of navigation systems, and LCDs of large automotive meters, and the like.

The present invention will now be illustrated in greater detail with reference to the following Examples, but the invention should not be construed as being limited thereto. Unless otherwise noted, all the percents are by weight.

EXAMPLES

I) Preparation of Methacrylic Resins (Transparent Resins A to D)

To a monomer mixture consisting of 83.3% of methyl methacrylate, 1.7% of methyl acrylate and 15% of ethylbenzene were added 150 ppm of 1,1-di-t-butylperoxy-3,3,5-trimethylcyclohexane and 2300 ppm of n-octylmercaptane, followed by mixing uniformly. The resulting solution was continuously fed to a 10-liter closed pressure reactor, allowed to polymerize while stirring at an average temperature of 130° C. for an average residence time of 2 hours, and sent to a reservoir connected to the reactor. After the volatile content was removed under given conditions, and the polymer is continuously transferred to an extruder in a molten state, where it is pelletized to prepare a transparent resin compound (designated as "transparent resin A"). Transparent resin A was found to have a weight average molecular wight of 68,600 as measured by gel-permeation chromatography (GPC) using tetrahydrofuran (THF) as a solvent and HLC8120 available from Tosoh Corp.

The polymer prepared in the same manner as described above from which the volatile content had been removed under given conditions was mixed with 1000 ppm of stearyl alcohol, 1500 ppm of glycerol monostearate, and 300 ppm of 2-(2H-benzotriazol-2-yl)-p-cresol (ultraviolet absorber) to obtain transparent resin B.

The polymer prepared in the same manner as described above from which the volatile content had been removed under given conditions was mixed with 900 ppm of stearyl alcohol to obtain transparent resin C.

Into transparent resin C (refractive index: 1.49) was uniformly mixed 7.5 ppm of crosslinked organopolysiloxane beads having a particle size of 7 $\mu$m (refractive index: 1.43) in a Henschel mixer, and the mixture was pelletized by means of an extruder to prepare transparent resin D.

II) Preparation of Polycarbonate Resins (Transparent Resins E and F)

A polycarbonate resin was prepared from bisphenol A and diphenyl carbonate at a diphenyl carbonate/bisphenol A molar ratio of 1.10 by ester interchange in the presence of $2.8 \times 10^{-3}$ mol/mol-bisphenol A of a disodium salt of bisphenol A as a catalyst. The resulting polycarbonate resin contained 7 mol % of a terminal hydroxyl group based on the whole terminal groups as measured by NMR and a weight average molecular weight of 22100 as measured by GPC using THF as a solvent. The polycarbonate resin was uniformly mixed with 20 ppm of bisnonylphenyl hydrogenphosphite and 200 ppm of tris(2,2,4-t-butylphenyl) phosphite as heat stabilizers in a Henschel mixture, and the mixture was pelletized by means of an extruder to prepare transparent resin E.

A polycarbonate resin was prepared from bisphenol A, sodium hydroxide, phosgene, triethylamine as a catalyst, and p-t-butylphenol as a molecular weight modifier by a phosgene process using methylene chloride as a solvent. The resulting polycarbonate contained 0.9 mol % of a terminal hydroxyl group based on the whole terminal groups as measured by NMR and a weight average molecular weight of 22100 as measured by GPC using THF as a solvent. Heat stabilizers were uniformly mixed into the polycarbonate resin in the same manner as for transparent resin E to prepare transparent resin F.

III) Preparation of Cyclic Olefin Resin (Transparent Resin G)

A commercially available resin composition, Zeonoa 1060R supplied by Nippon Zeon Co., Ltd., was used, which contains a norbornene resin as a cyclic olefin resin.

IV) Carbonic Acid Gas

Carbonic acid gas having a carbon dioxide purity of 99.5% or more was used. Gas feed was carried out by means of a bomb.

V) Molds A, B and C

Three molds having different cavity configurations were used.

Mold A has a cavity of 243 mm in width, 324 mm in length, and 6 mm in thickness, formed of 6 mirror-polished walls.

Mold B has a cavity having a width of 190 mm, a length of 252 mm, and a thickness increasing from 1 to 3 mm in the width direction to make a wedge shape. One of the two 190 mm by 252 mm walls has fine unevenness engraved which gives a molded article having an uneven pattern of rectangular parallelepipeds having a height ("a" shown in FIG. 2) of 32 $\mu$m. The pitch ("b" shown in FIG. 2) of the pattern in the width direction is constant at 250 $\mu$m, while the pitch (b) in the lengthwise direction gradually decreases from 710 $\mu$m to 190 $\mu$m from both edges toward the middle of the length. The other five cavity walls are mirror finished.

Figure 3:
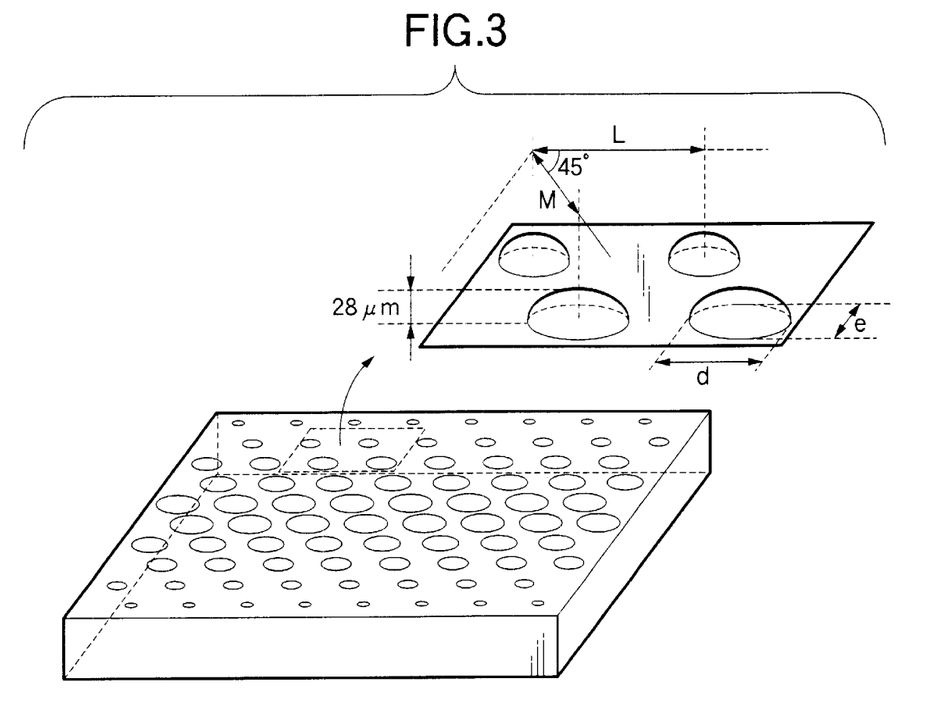
FIG. 3 is a schematic view for explaining fine unevenness of a light-conducting plate molded with a mold C as used in Examples 11 to 14.

Mold C has a 243 mm wide, 324 mm long, and 6 mm thick cavity. One of the two 243 mm by 324 mm walls has fine unevenness engraved, and the other five walls are mirror finished. The fine unevenness is such as to give a molded article having an uneven pattern of similar hemi-ellipsoids as shown in FIG. 3 whose major axis (d) and minor axis (e) gradually increasing from 200 to 380 $\mu$m and from 100 to 190 $\mu$m, respectively, from both 324 mm-long edges toward the center of the length, with a minor to major axis length ratio being fixed at 2 and their height being 28 $\mu$m at the maximum, which are arranged at a pitch (L) of 420 $\mu$m in the lengthwise direction and at a pitch (M) of 300 $\mu$m in the direction making 45° with the lengthwise direction.

The mold A is a side-gated mold having a fan gate of 30 mm in width and 3 mm in thickness disposed in the middle of the width (243 mm). The sprue has a length of 130 mm and a diameter of 12 mm at the gate side. The mold A has a compression mechanism in which the movable side frame on the side of the movable half of the mold slides by the action of a spring to open the mold in excess. The gate has a socket and spigot structure fitted into the fixed half of the mold so that the resin may not leak from the gate even when the mold is opened in excess.

The mold B is also a side-gated mold having a fan gate of 30 mm in width and 2 mm in thickness provided 45 mm away from the end having a thickness of 3 mm. The sprue has a length of 65 mm and a diameter of 8 mm at the gate side. The mold B has no compression mechanism, and the cavity configuration is engraved on the movable part of the mold.

The mold C is also a side-gated mold having a 30 mm wide and 6 mm thick fan gate provided on the middle of the width (243 mm). The sprue has a length of 130 mm and a diameter of 10 mm at the gate side. The mold has no compression mechanism, and a cavity block having a fine configuration is telescopically fitted to the fixed part of the mold.

Each of the molds A, B and C has O-ring gaskets around the ejection pin and the sprue bush and on the mating surface and the parting line surface to make the cavity hermetic.

VI) Evaluation

1) External Appearance

The appearance of the light-conducting plates produced was inspected with the naked eye for problematical foreign matter or cracks. Only the samples having no problematical defects were judged "good" and further evaluated for luminance.

2) Measurement of Luminance

Figure 4:
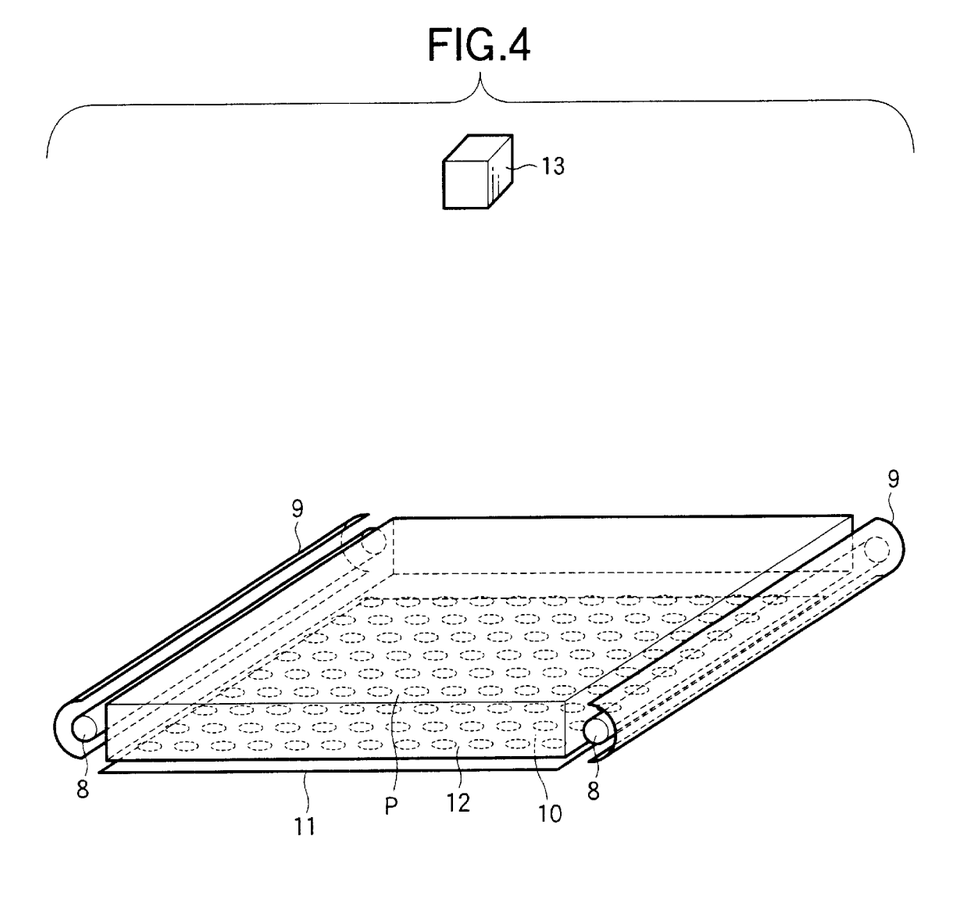
FIG. 4 is a schematic view illustrating a light-conducting plate molded with a mold A and a measuring system i as used in Examples 1 to 4.

A planar light emitting device as shown in FIG. 4 was produced using a light-conducting plate (12) obtained by use of the mold A. White circles arranged at a pitch of 1 mm were screen printed using a printing ink SR9300 (available from Teikoku Ink) on the reflecting sheet (11) side surface of the light-conducting plate (12) to provide a reflecting layer (10) on that side. The white circles had a continuously increasing diameter from 0.5 mm to 1 mm from the two longer sides (light incident side) toward the center. A lamp (8) for a 15-in. LCD monitor available from Stanley Electric Co., Ltd. and a reflector (9) were set on each longer side surface of the plate (12), and a voltage of 12 V was applied to let light enter the plate (12) from two directions. The surface luminance of the light-emitting surface (P) was measured with a luminance meter (13) (CA-1000, available from Minolta Camera Co., Ltd.) according to the standards of Electronic Industries Association of Japan (EIAJ ED-2525) to obtain the average luminance (L) of the total area and the difference (ΔL) between the maximum luminance ($L_{max}$) and the minimum luminance ($L_{min}$). This measurement system is referred to as system i. Further, the chromaticity (x, y) on the chromaticity diagram was measured with the same luminance meter in accordance with ASTM D2244-85 and D2244-93 to obtain the difference between the maximum x or y value and the minimum x or y value, respectively.

Figure 5:
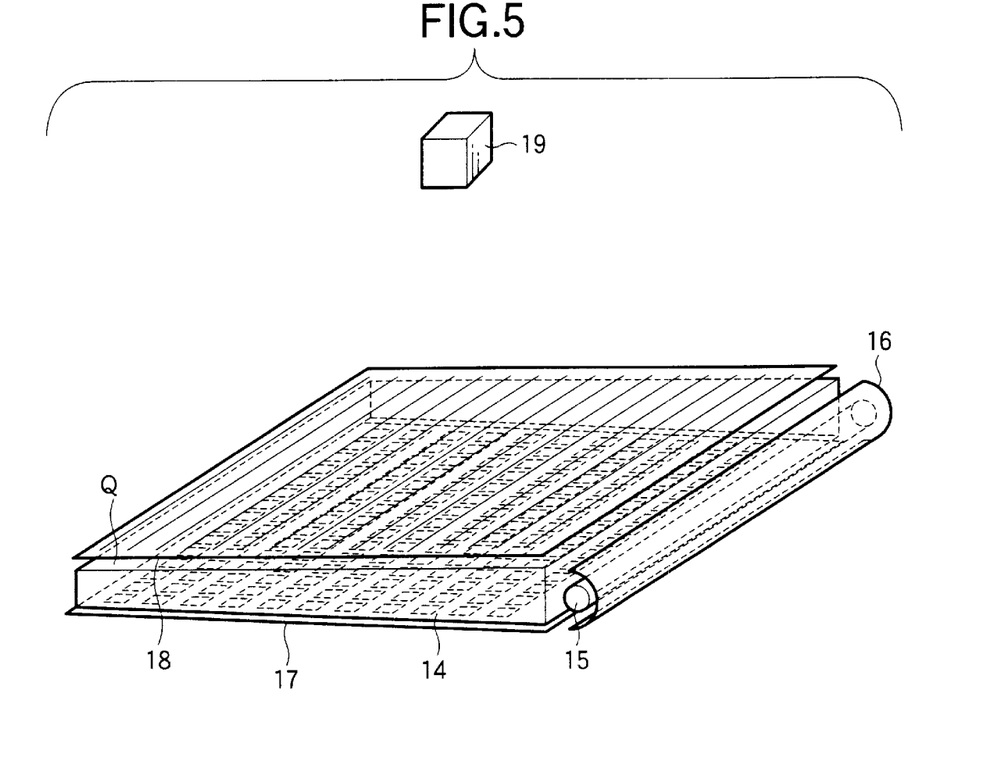
FIG. 5 is a schematic view illustrating a light-conducting plate molded with a mold B and a measuring system ii as used in Examples 5 to 10.

A planar light emitting device shown in FIG. 5 was produced using a light-conducting plate (14) prepared by the use of the mold B. A lamp (15) (a cold cathode ray tube HMBTM-24, available from Harrison Denki) and a reflector (16) were set by the 3 mm-thick side surface of the plate (14), and a voltage of 12 V was applied to make the light enter the plate (14) in one direction. The surface of the plate (14) having the fine unevenness was faced down, and a white reflecting sheet (17) was placed underneath that surface. A brightness enhancement film (18) (BEF-II, available from 3M Co.) was put on the light-emitting surface in parallel with the light source. The surface luminance of the light-emitting surface (Q) was measured with a luminance meter (19) (CA-1000, available from Minolta Camera Co., Ltd.) in the same manner as described above to obtain the average luminance (L) of the total area and the luminance difference ΔL between $L_{max}$ and $L_{min}$. This measurement system is referred to as system ii. Further, the chromaticity (x, y) was measured with the same luminance meter in accordance with ASTM D2244-85 and D2244-93 to obtain the difference between the maximum x or y value and the minimum x or y value, respectively.

Figure 6:
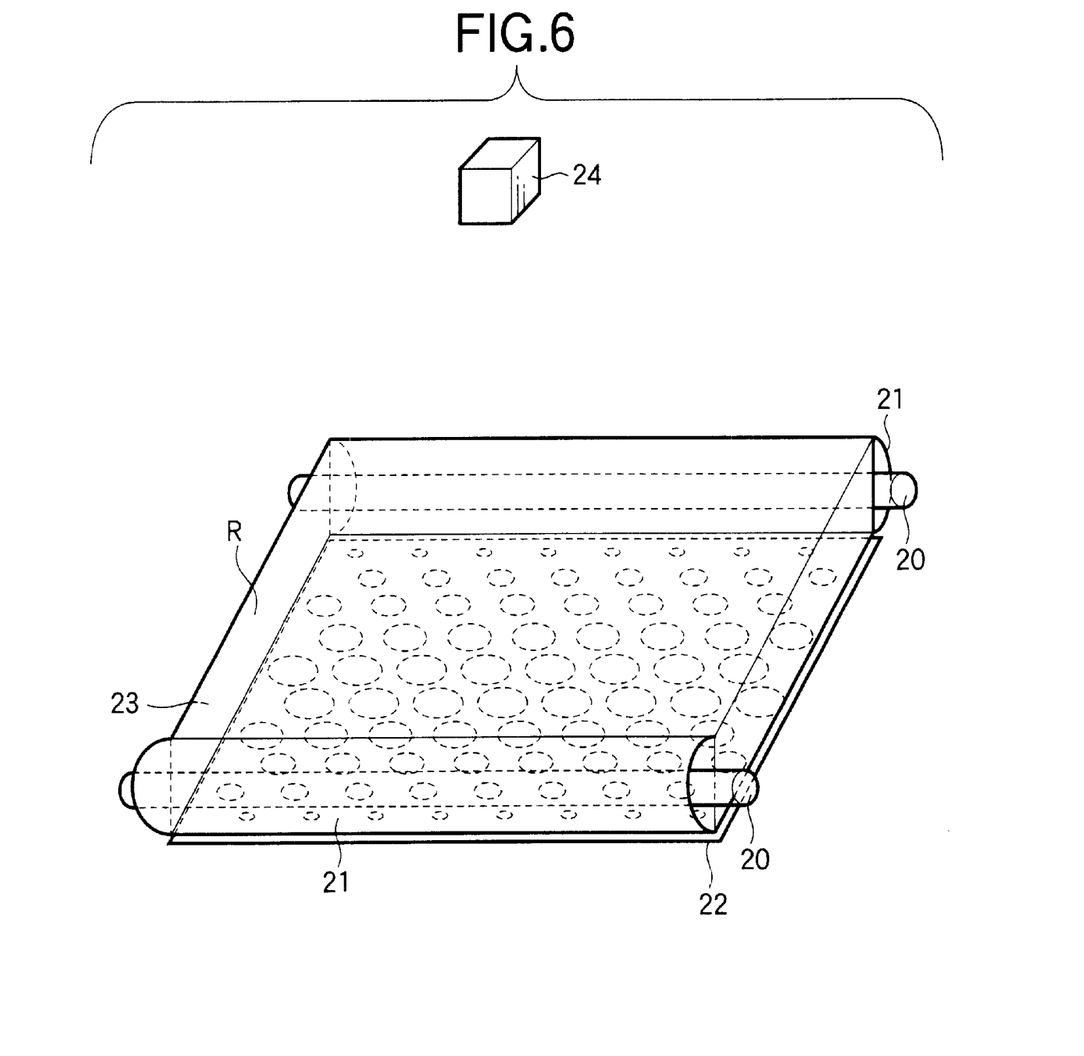
FIG. 6 is a schematic view illustrating a light-conducting plate molded with a mold C and a measuring system iii as used in Examples 11 to 14.

A planar light emitting device shown in FIG. 6 was produced using a light-conducting plate molded by use of the mold C. A lamp (20) (a cold cathode ray tube having a diameter of 4 mm and a length of 380 mm (supplied by Harrison Denki) and a reflector (21) made of a reflecting material LU-03-BR60, available from Mitsui Kagaku, were set by each longer side surface of the light-conducting plate (23). A voltage of 12 V was applied to make the light enter the plate (23) in two directions. A white reflecting film (22) was provided to face the fine unevenness surface of the plate (23). The surface luminance of the light-emitting surface (R) was measured with a luminance meter (24) (CA-1000, available from Minolta Camera Co., Ltd.) in the same manner as described above to obtain the average luminance (L) of the total area and the luminance difference ΔL between $L_{max}$ and $L_{min}$. This measurement system is referred to as system iii. Further, the chromaticity (x, y) was measured with the same luminance meter in accordance with ASTM D2244-85 and D2244-93 to obtain the difference between the maximum x or y value and the minimum x or y value, respectively.

EXAMPLE 1

An injection molding machine IP-1050 supplied by Komatsu Ltd. (clamping force: 300 t) was used. The screw of the molding machine IP-1050 was exchanged for a vented screw. A 6-mm hole and a 4-mm hole were made in the barrel corresponding to the vent of the screw. A pipe was fitted into the 6-mm hole, and a carbonic acid gas bomb was connected to the pipe. A pressure gauge was attached to the 4-mm hole. The screw end was sealed with an O-ring gasket against gas leakage. The screw clearance of the hopper side of the vented part was decreased to 0.3 mm to prevent carbonic acid gas from escaping toward the hopper feed zone.

The mold A was fitted to the molding machine, and dried transparent resin B was injection molded as follows. The cylinder temperature and the mold temperature were set at 230° C. and 60° C., respectively. With the shut-off nozzle closed, the resin was screw-plasticized while feeding carbonic acid gas into the cylinder through the pipe under a pressure of 8 MPa and applying a screw pressure of 8 MPa against the carbonic acid gas pressure. After the completion of plasticizing, the cylinder was forwarded to confirm that the nozzle was in touch with the mold. The mold was closed under a clamping force of 120 t and stopped at a mold opening of 1 mm, and the mold cavity was filled with carbonic acid gas from a carbonic acid gas bomb under a pressure of 4 MPa. The molten resin was then injected for an injection time of 6 seconds. When the injection was 99% completed, compression was started. The resin was compressed at 300 t until a mold opening was reduced to 0.4 mm. Completion of the injection was followed by pressure dwelling under 30 MPa for 5 seconds. Four seconds after the start of the pressure dwelling, the carbonic acid gas was released from the cavity. At the time when the mold opening was reduced to 0.4 mm, the clamping force was dropped to 195 t, under which compression was continued. 90 seconds after the completion of the injection, the mold was opened, and the molded article was taken out.

The resulting light-conducting plate was immediately weighed on an electronic balance. The plate was left to stand in a hot air drier at 150° C. for at least 3 hours. After confirming that the weight became constant, the plate was again weighed. The results revealed that the molded light-conducting plate contained 1.0% of carbonic acid gas.

EXAMPLE 2

A light-conducting plate was prepared in the same manner as in Example 1, except that the carbonic acid gas pressure fed into the cylinder and the pressure applied to the screw during plasticization were both changed to 4.5 MPa. The carbonic acid gas content in the resulting plate was measured in the same manner as in Example 1 and found to be 0.3%.

EXAMPLE 3

A light-conducting plate was prepared in the same manner as in Example 1, except that transparent resin B was plasticized with no carbonic acid gas fed into the cylinder while applying a back pressure of 1 MPa and that the cavity was not filled with carbonic acid gas (and therefore gas release from the cavity was not conducted).

The resulting plate was put in a SUS-made pressure vessel, in which carbonic acid gas from the bomb was introduced under 2 MPa for 22 hours to have the plate absorb carbonic acid gas. The pressure was released, and the plate was taken out of the vessel. The plate thus treated was evaluated in the same manner as in Example 1 and found to have a carbonic acid gas content of 0.4%.

COMPARATIVE EXAMPLE 1

A light-conducting plate was prepared in the same manner as in Example 3, except that the molded plate was not treated with carbonic acid gas.

EXAMPLE 4

A light-conducting plate was prepared in the same manner as in Example 1, except for replacing transparent resin B with dried transparent resin D. The resulting plate was evaluated in the same manner as in Example 1 and found to have a carbonic acid gas content of 1.0%.

COMPARATIVE EXAMPLE 2

A light-conducting plate was prepared in the same manner as in Comparative Example 1, except for replacing transparent resin B with dried transparent resin D.

EXAMPLE 5

An injection molding machine TM-220 supplied by Toyo Machinery & Metal Co., Ltd. (clamping force: 220 t) was used. The screw of the molding machine TM-220 was exchanged for a vented screw, and the same alterations as in Example 1 were made to the cylinder and the screw. A shut-off nozzle was used.

The mold B was fitted to the molding machine, and dried transparent resin B was injection molded as follows. The cylinder temperature and the mold temperature were set at 240° C. and 70° C., respectively. With the shut-off valve closed, the resin was plasticized while feeding carbonic acid gas into the cylinder under a pressure of 5-MPa and applying a screw pressure of 5 MPa against the carbonic acid gas pressure. After the completion of the plasticization, it was confirmed that the nozzle was in touch with the mold. Then, the mold cavity was filled with carbonic acid gas under a pressure of 5 MPa, and the molten resin was injected for an injection time of 1 second, followed by pressure dwelling at a dwell pressure of 100 MPa for 10 seconds with the gate sealed. Zero-point-three second after the start of the pressure dwelling, the carbonic acid gas was released from the cavity. 45 seconds after the completion of the injection, the mold was opened, and the molded article was taken out.

The resulting light-conducting plate was evaluated in the same manner as in Example 1 and found to have a carbonic acid gas content of 0.4%.

EXAMPLE 6

A light-conducting plate was prepared in the same manner as in Example 5, except that the carbonic acid gas pressure fed into the cylinder and the pressure applied to the screw during plasticization were both changed to 6.5 MPa. The carbonic acid gas content in the resulting plate was measured in the same manner as in Example 1 and found to be 0.6%.

EXAMPLE 7

A light-conducting plate was prepared in the same manner as in Example 5, except that the carbonic acid gas pressure fed into the cylinder and the pressure applied to the screw during plasticization were both changed to 2.5 MPa. The carbonic acid gas content in the resulting plate was measured in the same manner as in Example 1 and found to be 0.13%.

COMPARATIVE EXAMPLE 3

A light-conducting plate was prepared in the same manner as in Example 5, except that transparent resin B was plasticized with no carbonic acid gas fed into the cylinder while applying a back pressure of 1 MPa, and the cavity was not filled with carbonic acid gas (and therefore gas release from the cavity was not conducted).

COMPARATIVE EXAMPLE 4

The light-conducting plate obtained in Comparative Example 3 was put in a SUS-made pressure vessel, in which carbonic acid gas from the bomb was introduced under 0.1 MPa for 15 minutes to have the plate absorb carbonic acid gas. The pressure was released, and the plate was taken out of the vessel. The plate thus treated was evaluated in the same manner as in Example 1 and found to have a carbonic acid gas content of 0.006%.

EXAMPLE 8

An injection molding machine SG-260 supplied by Sumitomo Kikai K. K. (clamping force: 260 t) was used. The screw of the molding machine SG-260 was exchanged for a vented screw, and the same alterations as in Example 1 were made to the cylinder and the screw. A shut-off nozzle was used.

The mold B was fitted to the molding machine, and dried transparent resin E was injection molded as follows. The cylinder temperature and the mold temperature were set at 300° C. and 95° C., respectively. With the shut-off nozzle closed, the resin was plasticized while feeding carbonic acid gas into the cylinder under a pressure of 6 MPa and applying a screw pressure of 6 MPa against the carbonic acid gas pressure. After the completion of plasticizing, and after it was confirmed that the nozzle was in touch with the mold, the mold cavity was filled with carbonic acid gas under a pressure of 5 MPa, and the molten resin was then injected for an injection time of 1 second, followed by pressure dwelling at a dwell pressure of 100 MPa for 10 seconds with the gate sealed. Zero-point-four second after the start of the pressure dwelling, the carbonic acid gas was released from the cavity. 50 seconds after the completion of the injection, the mold was opened, and the molded article was taken out.

The resulting light-conducting plate was evaluated in the same manner as in Example 1 and found to have a carbonic acid gas content of 1.2%.

EXAMPLE 9

A light-conducting plate was prepared in the same manner as in Example 8, except for using dried transparent resin F.

The resulting plate was evaluated in the same manner as in Example 1 and found to have a carbonic acid gas content of 0.7%.

COMPARATIVE EXAMPLE 5

A light-conducting plate was prepared in the same manner as in Example 8, except that plasticizing was carried out with no carbonic acid gas fed into the cylinder while applying a back pressure of 1 MPa, and the cavity was not filled with carbonic acid gas (and therefore gas release from the cavity was not conducted).

EXAMPLE 10

Dried transparent resin G was injection molded in the same molding machine as used in Example 8 to which the mold B was fitted. The cylinder temperature and the mold temperature were set at 250° C. and 70° C., respectively. With the shut-off nozzle closed, the resin was plasticized while feeding carbonic acid gas into the cylinder under a pressure of 5 MPa and applying a screw pressure of 5 MPa against the carbonic acid gas pressure. After the completion of the plasticization, it was confirmed that the nozzle was in touch with the mold. The mold cavity was filled with carbonic acid gas under a pressure of 5 MPa, and the molten resin was then injected for an injection time of 1 second, followed by pressure dwelling at a dwell pressure of 65 MPa for 10 seconds with the gate sealed. Zero-point-three second after the start of the pressure dwelling, the carbonic acid gas was released from the cavity. 45 seconds after the completion of injection, the mold was opened, and the molded article was taken out.

The resulting light-conducting plate was evaluated in the same manner as in Example 1 and found to have a carbonic acid gas content of 0.5%.

COMPARATIVE EXAMPLE 6

A light-conducting plate was prepared in the same manner as in Example 10, except that carbonic acid gas was not fed to the cylinder during the plasticization and, instead, nitrogen gas was fed through the resin feed opening together with the resin G at a rate of 3 l/min, a back pressure of 1.2 MPa was applied during the plasticization, and the cavity was not filled with carbonic acid gas (and therefore no gas release was conducted).

EXAMPLE 11

An injection molding machine IS-550GS supplied by Toshiba Machine Co., Ltd. (clamping force: 550 t) was used. The same modifications as in Example 1 were made to the cylinder and the screw. A shut-off nozzle was used.

The mold C was fitted to the molding machine, and dried transparent resin B was molded as follows. The cylinder temperature and the mold temperature were set at 240° C. and 70° C., respectively. With the shut-off nozzle closed, the resin was plasticized while feeding carbonic acid gas into the cylinder under a pressure of 7 MPa and applying a screw pressure of 7 MPa against the carbonic acid gas pressure. After the completion of the plasticization and after it was confirmed that the nozzle was in touch with the mold, the mold cavity was filled with carbonic acid gas under a pressure of 5 MPa, the shut-off nozzle was opened, and the molten resin was then injected for an injection time of 3 seconds, followed by pressure dwelling at a dwell pressure of 30 MPa for 25 seconds. Twenty seconds after the start of the pressure dwelling, the carbonic acid gas was released from the cavity. 3 minutes after the completion of the injection, the mold was opened, and the molded article was taken out.

The resulting light-conducting plate was evaluated in the same manner as in Example 1 and found to have a carbonic acid gas content of 0.9%.

EXAMPLE 12

A light-conducting plate was prepared in the same manner as in Example 11, except that the carbonic acid gas pressure fed into the cylinder, the pressure applied to the screw during the plasticization, and the carbonic acid gas pressure filling the cavity were changed to 9.5 MPa, 9.5 MPa, and 6 MPa, respectively.

The resulting light-conducting plate was evaluated in the same manner as in Example 1 and found to have a carbonic acid gas content of 1.5%.

EXAMPLE 13

A light-conducting plate was prepared in the same manner as in Example 11, except that the carbonic acid gas pressure fed into the cylinder and the pressure applied to the screw during the plasticization were both changed to 1.2 MPa.

The resulting light-conducting plate was evaluated in the same manner as in Example 1 and found to have a carbonic acid gas content of 0.03%.

COMPARATIVE EXAMPLE 7

A light-conducting plate was prepared in the same manner as in Example 11, except that (1) transparent resin A was used in place of transparent resin B, (2) the resin was plasticized at a resin temperature of 270° C. with no carbonic acid gas fed to the cylinder, (3) a back pressure of 1 MPa was applied to the cylinder during the plasticization, (4) the cavity was not filled with carbonic acid gas, (5) the resin was injected into the mold kept at 85° C. for 3 seconds, followed by pressure dwelling under a dwell pressure of 30 MPa for 30 seconds, and (6) the molded article was taken out 4 minutes after the completion of the injection.

COMPARATIVE EXAMPLE 8

A light-conducting plate was prepared in the same manner as in Example 11, except that transparent resin A was used in place of transparent resin B and that the pressure of carbonic acid gas fed into the cylinder, the pressure imposed to the screw during the plasticization, and the carbonic acid gas pressure filling the cavity were changed to 22 MPa, 22 MPa, and 8 MPa, respectively.

The resulting light-conducting plate was evaluated in the same manner as in Example 1 and found to have a carbonic acid gas content of 2.7%.

COMPARATIVE EXAMPLE 9

The light-conducting plate obtained in Comparative Example 7 was put in a SUS-made pressure vessel, in which carbonic acid gas from the bomb was introduced under 0.1 MPa for 5 minutes to have the plate absorb carbonic acid gas. The pressure was released, and the plate was taken out of the vessel. The plate thus treated was evaluated in the same manner as in Example 1 and found to have a carbonic acid gas content of 0.002%.

EXAMPLE 14

A light-conducting plate was prepared in the same manner as in Example 11, except for replacing transparent resin B with transparent resin C.

The resulting light-conducting plate was evaluated in the same manner as in Example 1 and found to have a carbonic acid gas dioxide content of 0.8%.

COMPARATIVE EXAMPLE 10

A light-conducting plate was prepared in the same manner as in Comparative Example 7, except for replacing transparent resin A with transparent resin C.

A planar light emitting device was produced using each of the light-conducting plates prepared in the foregoing Examples 1 to 14 and Comparative Examples 1 to 10 according to FIGS. 4 through 6. The luminance and chromaticity of the devices were measured in accordance with the methods described above. The results obtained are shown in Table 1 below.

reduced color unevenness as compared with Comparative Example 3 having no carbonic acid gas content. Although Comparative Example 4 contains carbonic acid gas, no improvement in luminance nor luminance uniformity was obtained by a lower carbonic acid gas content than 0.01%. Similar results are observed in comparison between Examples 8 and 9 and Comparative Example 5 each using a resin composition comprising a polycarbonate resin and comparison between Example 10 and Comparative Example 6 each using a resin composition comprising a cyclic olefin resin.

Similarly, Examples 11 to 13, in which the mold C and the measuring system iii are adopted, provide a planar light emitting device having an average luminance improved by nearly 10%, a smaller difference between $L_{max}$ and $L_{min}$, and reduced color unevenness as compared with Comparative

TABLE 1

| Example No. | Mold | Measuring System | Transparent Resin | $CO_2$ Content (wt %) | Appearance | Average Luminance (nt) | ΔL ($L_{max} - L_{min}$) (nt) | Difference between Max. Chromaticity and Min. Chromaticity | |
|---|---|---|---|---|---|---|---|---|---|
| | | | | | | | | x value | y value |
| Ex. 1 | A | i | B | 1.0 | good | 1067 | 258 | 0.011 | 0.009 |
| Ex. 2 | A | i | B | 0.3 | good | 1060 | 260 | 0.009 | 0.007 |
| Ex. 3 | A | i | B | 0.4 | good | 1058 | 265 | 0.010 | 0.008 |
| Compa. Ex. 1 | A | i | B | 0 | good | 1001 | 290 | 0.020 | 0.019 |
| Ex. 4 | A | i | D | 1.0 | good | 1064 | 253 | 0.009 | 0.012 |
| Compa. Ex. 2 | A | i | D | 0 | good | 1011 | 276 | 0.012 | 0.021 |
| Ex. 5 | B | ii | B | 0.4 | good | 599 | 188 | 0.004 | 0.007 |
| Ex. 6 | B | ii | B | 0.6 | good | 605 | 185 | 0.004 | 0.008 |
| Ex. 7 | B | ii | B | 0.13 | good | 600 | 185 | 0.004 | 0.007 |
| Compa. Ex. 3 | B | ii | B | 0 | good | 539 | 208 | 0.012 | 0.015 |
| Compa. Ex. 4 | B | ii | B | 0.006 | good | 549 | 210 | 0.012 | 0.012 |
| Ex. 8 | B | ii | E | 1.2 | good | 572 | 180 | 0.008 | 0.013 |
| Ex. 9 | B | ii | F | 0.7 | good | 548 | 185 | 0.008 | 0.014 |
| Compa. Ex. 5 | B | ii | E | 0 | good | 520 | 195 | 0.015 | 0.020 |
| Ex. 10 | B | ii | G | 0.5 | good | 585 | 183 | 0.006 | 0.010 |
| Compa. Ex. 6 | B | ii | G | 0 | good | 530 | 205 | 0.014 | 0.016 |
| Ex. 11 | C | iii | B | 0.9 | good | 1057 | 257 | 0.008 | 0.012 |
| Ex. 12 | C | iii | B | 1.5 | good | 1060 | 259 | 0.008 | 0.010 |
| Ex. 13 | C | iii | B | 0.03 | good | 1036 | 273 | 0.009 | 0.015 |
| Compa. Ex. 7 | C | iii | A | 0 | good | 904 | 290 | 0.009 | 0.025 |
| Compa. Ex. 8 | C | iii | A | 2.7 | cracks developed | not measured | — | not measured | not measured |
| Compa. Ex. 9 | C | iii | A | 0.002 | good | 915 | 288 | 0.009 | 0.023 |
| Ex. 14 | C | iii | C | 0.8 | good | 1043 | 262 | 0.008 | 0.011 |
| Compa. Ex. 10 | C | iii | C | 0 | good | 907 | 283 | 0.008 | 0.023 |

The results in Table 1 show the following observations. Compared with Comparative Example 1 containing no carbonic acid gas, Examples 1 to 3 exhibit a higher average luminance by about 5 to 6% and a small difference between $L_{max}$ and $L_{min}$, securing brighter and more uniform planar light emission. Examples 1 to 3 also have a smaller difference between the maximum chromaticity and the minimum chromaticity in both x and y values, indicating smaller color unevenness in planar light emission. It is apparent that the planar light emitting devices of Examples 1 to 3 are superior to a conventional one.

Comparison between Example 4 and Comparative Example 2 both using resin D containing light-scattering particles also reveals that incorporation of carbonic acid gas brings about nearly 5% improvement in the average luminance, a reduction in difference between $L_{max}$ and $L_{min}$, and reduction in color unevenness.

Examples 5 to 7, in which the mold B and the measuring system ii are used, similarly provide a planar light emitting device having an average luminance improved by more than 10%, a smaller difference between $L_{max}$ and $L_{min}$, and Example 7 having no carbonic acid gas content or Comparative Example 9 having a smaller carbonic acid gas content than 0.01%. In Comparative Example 8, the light-conducting plate containing more than 2% of carbonic acid gas developed cracks, which is a fatal defect as a light-conducting plate.

Example 14 using resin C also provides a planar light emitting device which exhibits more than 5% improvement in average luminance, a smaller difference between $L_{max}$ and $L_{min}$, and smaller color unevenness as compared with Comparative Example 10 using resin C.

The light-conducting plate according to the invention, whatever configuration it may have, provides a planar light emitting device which emits light with improved brightness (luminance), improved luminance uniformity, and reduced color unevenness.

While the invention has been described in detail and with reference to specific examples thereof, it will be apparent to one skilled in the art that various changes and modifications can be made therein without departing from the spirit and scope thereof.

What is claimed is:

1. A light-conducting plate which comprises a transparent resin containing a carbonic acid gas and which has a carbonic acid gas content of from 0.01 to 2% by weight based on the weight of the light-conducting plate.

2. The light-conducting plate according to claim 1, wherein said transparent resin is selected from methacrylic resins, polycarbonate resins and cyclic olefin resins.

3. The light-conducting plate according to claim 1, wherein said transparent resin further contains fine particles.

4. The light-conducting plate according to claim 1, which has a light-emitting surface and an opposite surface and has fine unevenness on at least one of these surfaces.

5. The light-conducting plate according to claim 1, which has a light-emitting surface having a lens shape.

6. The light-conducting plate according to claim 1, which has a wedge shape having an inclined reflecting plane.

7. A light-conducting plate which comprises a transparent resin containing a carbonic acid gas and which has a carbonic acid gas content of from 0.01 to 2% by weight based on the weight of the light-conducting plate wherein said transparent resin is a polycarbonate resin having a terminal hydroxyl group in a proportion of from 1 to 30 mol % based on the whole terminal group.

8. A light-conducting plate which comprises a transparent resin containing a carbonic acid gas and which has a carbonic acid gas content of from 0.01 to 2% by weight based on the weight of the light-conducting plate wherein said transparent resin contains at least one of a saturated aliphatic higher alcohol, a glycerol higher fatty acid ester, and an ultraviolet absorber.

9. The light-conducting plate according to claim 8, wherein said transparent resin is a methacrylic resin.

\* \* \* \* \*